United States Patent Office 3,194,272
Patented July 13, 1965

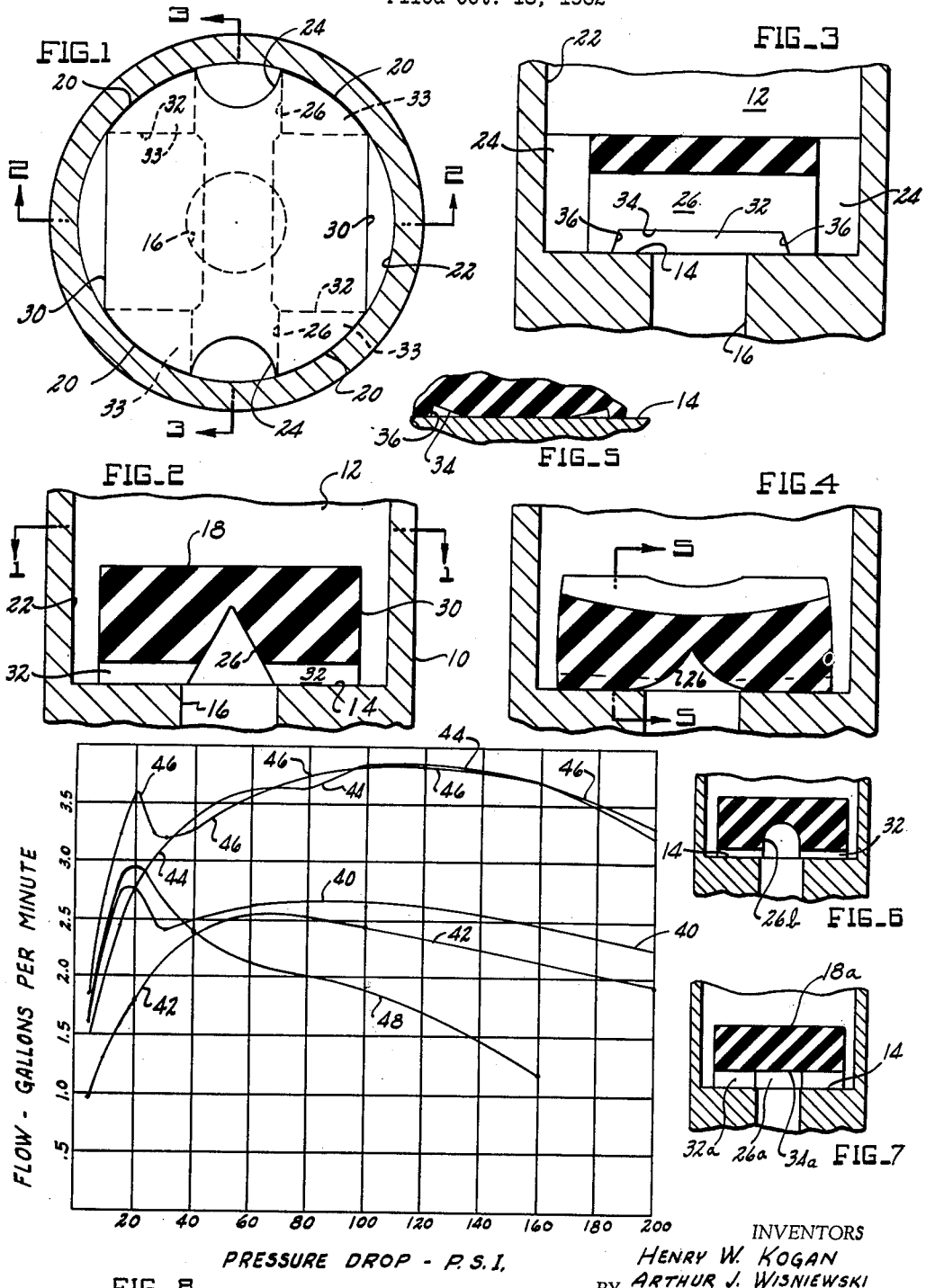

3,194,272
FLOW CONTROL DEVICE
Henry W. Kogan, Oak Park, Arthur J. Wisniewski, Hamtramck, and Thaddeus J. Cialek, Madison Heights, Mich., assignors to American Radiator & Standard Sanitary Corporation, New York, N.Y., a corporation of Delaware
Filed Oct. 18, 1962, Ser. No. 231,414
6 Claims. (Cl. 138—43)

This invention relates to a flow control device for use in a liquid line to maintain a substantially constant volumetric delivery in the line in spite of wide variations in liquid supply pressure. The device has application in various fields, including water valves for domestic clothes washing machines and dishwashing machines, and coin-operated liquid dispensers for coffee and soft drinks.

One object of the invention is to provide a flow control device which is able to maintain a substantially constant volumetric flow over a relatively wide range of liquid supply pressures, as for example from a low pressure of about 10 p.s.i. through a high pressure of about 200 p.s.i.

A further object of the invention is to provide a flow control device which can be manufactured at relatively low cost in competition with other devices which do not have the same range of operation as the present device.

Other objects of this invention will appear from the following description and appended claims, reference being had to the accompanying drawings forming a part of this specification wherein like reference characters designate corresponding parts in the several views.

In the drawings:
FIGURE 1 is a sectional view through one embodiment of the invention taken on line 1—1 in FIG. 2;
FIG. 2 is a sectional view taken on line 2—2 in FIG. 1;
FIG. 3 is a sectional view taken on line 3—3 in FIG. 1;
FIG. 4 is a view taken in the same direction as FIG. 2 but showing the flow control device when subjected to relatively high liquid pressure;
FIG. 5 is a fragmentary sectional view taken on line 5—5 in FIG. 4;
FIG. 6 is a sectional view taken in the same direction as FIG. 2 but illustrating another embodiment of the invention;
FIG. 7 is a sectional view showing a predecessor of the FIG. 6 control devices; and
FIG. 8 is a graph which plots the performance of certain flow control devices, including those of FIGS. 1 and 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGS. 1 through 5 of the drawings, there is shown a flow control device comprising a liquid passageway means 10 which forms a liquid inlet chamber 12, an annular seat 14, and a central liquid outlet opening 16. The passageway means may in commercial practice be of a liquid pipeline, a short tubular coupling for attachment to a pipeline, or part of a valve body. Disposed within chamber 12 of the passageway means is a flow control disc 18 preferably formed of rubber or similar resilient deformable material. Disc 18 is provided with four arcuate edge surfaces 20 which lie closely adjacent the inner cylindrical surface 22 of chamber 12 to position the disc centrally over the outlet opening 16.

At two diametrically spaced points on the disc-periphery there are provided semi-circular notches 24 which conduct liquid from the space above disc 18 to areas adjacent seat 14. The liquid thereafter flows through a deep groove 26 which is preferably of triangular cross section as shown in FIG. 2. As seen in FIG. 1 groove 26 extends entirely across the downstream face of the flow control disc between the two notches 24 so that liquid can flow in two paths through the two notches 24 and thence in different parts of groove 26 to reach the outlet opening 16. Two additional liquid paths are provided outside of the two flat disc edge surfaces 30 which lead to opposite ends of a shallow groove 32 formed on the downstream face of the disc. The triangular disc portions 33 lying alongside the grooves constitute feet which engage seat 14 and thus support the disc for flow of liquid through the various grooves. As shown in FIGS. 2 and 3, groove 26 is much deeper than groove 32 while groove 32 is much wider than groove 26.

With no pressure differential between chamber 12 and outlet opening 16 the disc assumes the condition of FIGS. 2 and 3. As the inlet pressure is raised groove 32 is collapsed toward the condition of FIG. 5 wherein the groove roof surface 34 engages seat 14; this collapsing action occurs at relatively low pressure and is believed due to the wideness of the groove which provides a relatively long unsupported roof span (as seen in FIG. 3). During the period when roof surface 34 is collapsing the groove 26 roof surface is also collapsing so that it exerts an additional variable restriction action on the liquid during low liquid pressure periods. However the size relationships are such that the restricting action of groove 26 during the low pressure period is not as substantial as the action of groove 32.

As the inlet pressure is increased from a low pressure value the traingular groove 26 is collapsed from the FIG. 2 contour to FIG. 4 contour and beyond. Thus there is a variable restricting action by groove 32 at low pressure and a second variable restricting action by groove 26 at high pressure. In normal operations below 200 p.s.i. apparently neither groove is completely restricted so that presumably some flow takes place in each groove.

The device may be constructed in various sizes but in one test form the flow control disc has a major diameter of about 11/16 inch, and an axial thickness of about 1/4 inch. In this construction groove 32 is about 1/32 inch deep and about 3/8 inch wide, and groove 26 is about 3/16 inch wide at its base and about 5/32 inch high. The sides of the groove triangle have an included angle of about sixty degrees. The performance of this tested form is shown by curve 40 in FIG. 8.

A construction identical with that of FIG. 2, but without groove 32, was built and tested. Its performance is detonated by curve 42 in FIG. 8. By comparing curves 40 and 42 it will be seen that groove 32 apparently gives the disc increased flexibility and flow capacity so that it is able to begin controlling the flow at a relatively low pressure.

For many applications a device is suitable if it controls the flow within plus or minus ten per cent of its rated flow. If we rate the curve 40 device at 2.5 gallons per minute it meets the acceptability test for a pressure range from about 10 p.s.i. up to about 200 p.s.i. In contrast the device of curve 42 has acceptable flow in a relatively narrow operating range from about 30 p.s.i. up to about 140 p.s.i. The superior performance of the curve 40 device is believed due to the ability of groove 32 to conduct liquid not only while in the low pressure range but also while in the higher pressure range. Thus, in FIG. 8 the vertical distance between curves 40 and 42 at any given pressure is a measure of the flow through groove 32; curve 40 is at all pressure points above curve 42 which indicates that some liquid is at all times flowing in groove 32. This is also indicated by FIG. 5 which illustrates that groove 32 never completely closes against seat 14.

Other variations from that of FIG. 1 have been built and tested. Thus, a construction was built identical with that of FIG. 1 (curve 40) except that groove 42 was 3/16 inch wide instead of 3/8 inch wide. The performance of this variation is detonated by curve 44 in FIG. 8. By comparing curves 40 and 44 it will be seen that reducing the width of groove 32 has an adverse effect on performance. The reduced width groove 32 does not conduct sufficient liquid at low pressures and is not easily enough collapsed at high pressures to provide acceptable flow over a sufficient pressure range. From this it is concluded that groove 32 should be of appreciable width for optimum performance.

FIG. 6 shows a flow control disc which is generally similar to the FIG. 2 disc except that the triangular shaped groove 26 is replaced with a groove 26b having a circular roof configuration. Curve 46 in FIG. 8 denotes the performance characteristic for a FIG. 6 flow control, wherein groove 26b has a depth of about .126 inch. It will be seen that in general the flow tends to vary to a greater extent than when a triangular shaped groove 26 is used. Apparently a groove 26b of .126 inch depth will not collapse quite as rapidly as the triangular groove 26 of FIG. 2. For a given groove depth the groove 26b has a larger cross section than the triangular groove, which accounts for the fact that curve 46 is elevated above curve 40 in FIG. 8.

The curve identified by numeral 48 is for a flow control disc similar to that shown in FIG. 6 but with groove 26b having a height of .082 inch. Reducing the depth of groove 26b from .126 inch to .082 inch causes the flow to rapidly drop off when the pressures are about 80 p.s.i.; therefore there is apparently a minimum groove height for the attainment of satisfactory results. Apparently in the case of the .082 inch depth groove the amounts of rubber forming the side surfaces of the groove are so reduced that the groove has insufficient collapse resistance. It is believed that the groove undergoes a buckling action instead of the spreading action which is believed to characterize groove 26 of FIGS. 2 and 4.

Prior to building the units of FIGS. 2 and 6 we built a unit as shown in FIG. 7. In the FIG. 7 construction the undersurface of the deformable disc 18a is provided with two identical cross grooves 26a and 32a, each of appreciable width and limited depth. In theory the disc deforms under pressure so that each of the grooves exerts a similar control action on the liquid. However, it was discovered that when both of the grooves were constructed as in FIG. 7 the disc tended to deform excessively at relatively low pressures so that the groove roof surfaces 34a collapsed against seat 14 prematurely; a sharp drop-off in flow rate was experienced at relatively low pressures in the neighborhood of 60 or 70 p.s.i.

Efforts were also made to provide a flow control disc having a single rectangular cross section slot generally similar to slot 26a. However when the slot was made narrow it did not provide sufficient throttling of the fluid, so that the volumetric delivery tended to increase continuously with increasing pressure drop. When the slot was widened it tended to collapse permanently.

From the above discussion it will be seen that the FIG. 1 construction constitutes a preferred embodiment of the invention. In this embodiment noteworthy features are the wide but shallow control groove 32, and the relatively deep triangular groove 26. The triangular groove 26 apparently can restrict with a combined vertical deformation and lateral spreading action rather than with only a vertical collapsing action which characterizes the FIG. 7 construction.

Two embodiments of the invention have been shown and described, but it will be realized that the invention may be practiced in other forms as come within the scope of the appended claims.

We claim:

1. In a pressure responsive flow control device: an annular seat facing upstream and defining a central outlet opening; a resilient elastomeric flow control disc having two intersecting grooves of substantial cross sectional area defining four spaced feet, said disc being arranged with four feet engaging said seat; first and second ones of said feet being relatively close together to provide a relatively narrow flow groove portion; third and fourth ones of said feet being relatively close together to provide a relatively narrow flow groove portion; the first and third feet being relatively far apart to provide a wide flow groove portion; and the second and fourth feet being relatively far apart to provide a wide flow groove position; the unsupported disc surface areas between the feet constituting groove roof areas which collapse toward the seat in response to fluid pressure on the disc; the roof areas for the wide groove portions being more easily collapsed onto the seat than the roof areas for the narrow groove portions so that the wide passages variably restrict in a low pressure range and the narrow groove portions variably restrict in a high pressure range.

2. In a pressure responsive flow control device: an annular uni-planar seat facing upstream and defining a central outlet opening; a resilient elastomeric flow control disc located on said seat and having four radial groove portions in its downstream face for conveying fluid to the central opening; two of the groove portions being wide and shallow for variety restricting the flow in a low pressure range; and two of the groove portions being narrower and deeper for variably restricting the flow in a high pressure range.

3. In a pressure responsive flow control device: an annular uni-planar seat facing upstream and defining a central outlet opening; a resilient elastomeric flow control disc located on said seat and having two diametrical grooves in its downstream face; one of said grooves being a relatively wide shallow groove; and the other groove being a deeper and narrower groove, whereby the wide shallow groove is able to collapse onto the seat in a relatively low pressure range and the deeper and narrower groove is able to collapse toward the seat in a relatively high pressure range.

4. In a pressure responsive flow control device: an annular flat uni-planar seat facing upstream and defining a central outlet opening; a resilient elastomeric flow control disc located on said seat and having two intersecting diametrical flow grooves in its downstream face; one of said grooves being a relatively wide shallow groove, and the other being a deeper and narrower groove of substantially triangular cross section.

5. In a pressure responsivce flow control device: an annular seat facing upstream and defining a central outlet opening; a deformable flow control disc located on said seat and having flow passages in its downstream face; one of said passages being relatively wide and shallow to undergo substantial change in area in a low pressure range; another of said passages being deeper and narrower to undergo substantial change in area only in a high pressure range.

6. In a pressure responsive flow control device: an annular flat uni-planar seat facing upstream and defining a central outlet opening; a resilient elastomeric flow control disc located on said seat and having two intersecting diametrical flow grooves extending across its downstream face; said disc having a diameter between two and three times its axial thickness; one of said grooves being a relatively wide shallow groove having a width greater than the disc axial thickness and a depth less than one-quarter of the disc axial thickness; the other groove being a deeper and narrower groove of substantialy triangular cross section, the depth of said other groove being about one-half the disc axial thickness, and the width of said other groove at its widest point being less than the disc axial thickness.

References Cited by the Examiner
UNITED STATES PATENTS

| | | | |
|---|---|---|---|
| 2,762,397 | 9/56 | Miller | 138—43 |
| 2,838,072 | 6/58 | Stumm | 138—43 XR |
| 2,878,836 | 3/59 | Binks | 137—517 XR |
| 2,953,168 | 9/60 | Vomacka | 138—43 |
| 2,962,046 | 11/60 | Bochan | 137—513.5 |

WILLIAM F. O'DEA, *Primary Examiner.*